(12) United States Patent
Abe et al.

(10) Patent No.: US 8,932,193 B2
(45) Date of Patent: Jan. 13, 2015

(54) SHEET FEED ROLLING ELEMENT FOR USE IN AN ELECTROPHOTOGRAPHIC DEVICE AND MOLD FOR INJECTION MOLDING FOR PRODUCING THE SHEET FEED ROLLING ELEMENT

(75) Inventors: Hirohisa Abe, Toin (JP); Norikazu Muneda, Toin (JP)

(73) Assignee: NTN Corporation, Osaka (JP)

( * ) Notice: Subject to any disclaimer, the term of this patent is extended or adjusted under 35 U.S.C. 154(b) by 565 days.

(21) Appl. No.: 12/989,809

(22) PCT Filed: Apr. 28, 2009

(86) PCT No.: PCT/JP2009/058338
§ 371 (c)(1),
(2), (4) Date: Oct. 27, 2010

(87) PCT Pub. No.: WO2009/133880
PCT Pub. Date: Nov. 5, 2009

(65) Prior Publication Data
US 2011/0042854 A1 Feb. 24, 2011

(30) Foreign Application Priority Data

Apr. 30, 2008 (JP) .................. 2008-119034
Jul. 29, 2008 (JP) .................. 2008-194571
Apr. 21, 2009 (JP) .................. 2009-102813

(51) Int. Cl.
F16C 13/00 (2006.01)
B65H 27/00 (2006.01)
B29C 45/00 (2006.01)
B29L 31/32 (2006.01)

(52) U.S. Cl.
CPC ............ B65H 27/00 (2013.01); B29C 45/0025 (2013.01); *B29C 2045/0034* (2013.01);
(Continued)

(58) Field of Classification Search
CPC ......... F16C 13/00; F16C 13/003; B65H 5/06; B65H 5/066; B65H 3/06; B65H 3/0638; B65H 27/00

USPC .......... 492/22, 25, 27, 28, 48, 57, 16, 18, 56, 492/59; 271/109
See application file for complete search history.

(56) References Cited

U.S. PATENT DOCUMENTS 4,203,509 A * 5/1980 Thompson et al. ............ 193/37
4,538,668 A * 9/1985 Nishihara et al. ............ 164/448
(Continued)

FOREIGN PATENT DOCUMENTS

JP  9-315615   12/1997
JP  11-011731   1/1999
(Continued)

OTHER PUBLICATIONS

International Search Report issued May 26, 2009 in International (PCT) Application No. PCT/JP2009/058338.

*Primary Examiner* — Essama Omgba
(74) *Attorney, Agent, or Firm* — Wenderoth, Lind & Ponack, L.L.P.

(57) ABSTRACT

A sheet feed rolling element for an electrophotographic device includes a roller portion and shoulders on both sides formed by curved chamfers. A parting line between the fixed mold plate and the movable mold plate of an injection mold is located at the boundary between one shoulder and the roller portion outer periphery, a step is provided at the boundary due to a difference between the opening diameter of the cavity portion defined by the fixed mold plate and the opening diameter of the cavity portion defined by the movable mold plate so the one shoulder has a smaller diameter than the outer peripheral surface, and a chamfer is provided adjacent to the one shoulder to absorb any difference in molding shrinkage rate due to a difference in molecular orientation of resin at the step, thereby preventing circumferential bulging on the outer periphery of the formed roller portion.

9 Claims, 7 Drawing Sheets

(52) U.S. Cl.
  CPC ..... *B29L 2031/322* (2013.01); *B65H 2401/113* (2013.01); *B65H 2402/80* (2013.01); *B65H 2404/135* (2013.01); *B65H 2801/06* (2013.01)
  USPC .......... 492/27; 492/28; 492/18; 492/56; 492/59; 492/57; 271/109

(56) References Cited

U.S. PATENT DOCUMENTS

| | | | |
|---|---|---|---|
| 5,001,820 A * | 3/1991 | Yoshida et al. | 492/2 |
| 6,020,417 A | 2/2000 | Umemoto et al. | |
| 6,032,778 A * | 3/2000 | O'Donnell | 193/37 |
| 7,464,467 B2 * | 12/2008 | Fukuyama | 29/895.22 |
| 8,028,988 B2 * | 10/2011 | Shakespeare et al. | 271/109 |
| 8,206,277 B2 * | 6/2012 | Sutton et al. | 492/7 |
| 8,328,704 B2 * | 12/2012 | Kotaka et al. | 492/49 |
| 8,708,878 B2 * | 4/2014 | Masuda et al. | 492/56 |
| 2006/0071421 A1 * | 4/2006 | Itoh | 271/272 |
| 2006/0082052 A1 * | 4/2006 | Noda | 271/314 |
| 2008/0044206 A1 | 2/2008 | Kotaka et al. | |
| 2013/0075234 A1 * | 3/2013 | Ishibashi et al. | 198/780 |

FOREIGN PATENT DOCUMENTS

| | | | |
|---|---|---|---|
| JP | 2000-355434 | 12/2000 | |
| JP | 2003-231157 | 8/2003 | |
| JP | 2003311808 A * | 11/2003 | B29C 47/20 |
| JP | 2004-189485 | 7/2004 | |
| JP | 2004-314310 | 11/2004 | |
| JP | 2008-044753 | 2/2008 | |

* cited by examiner

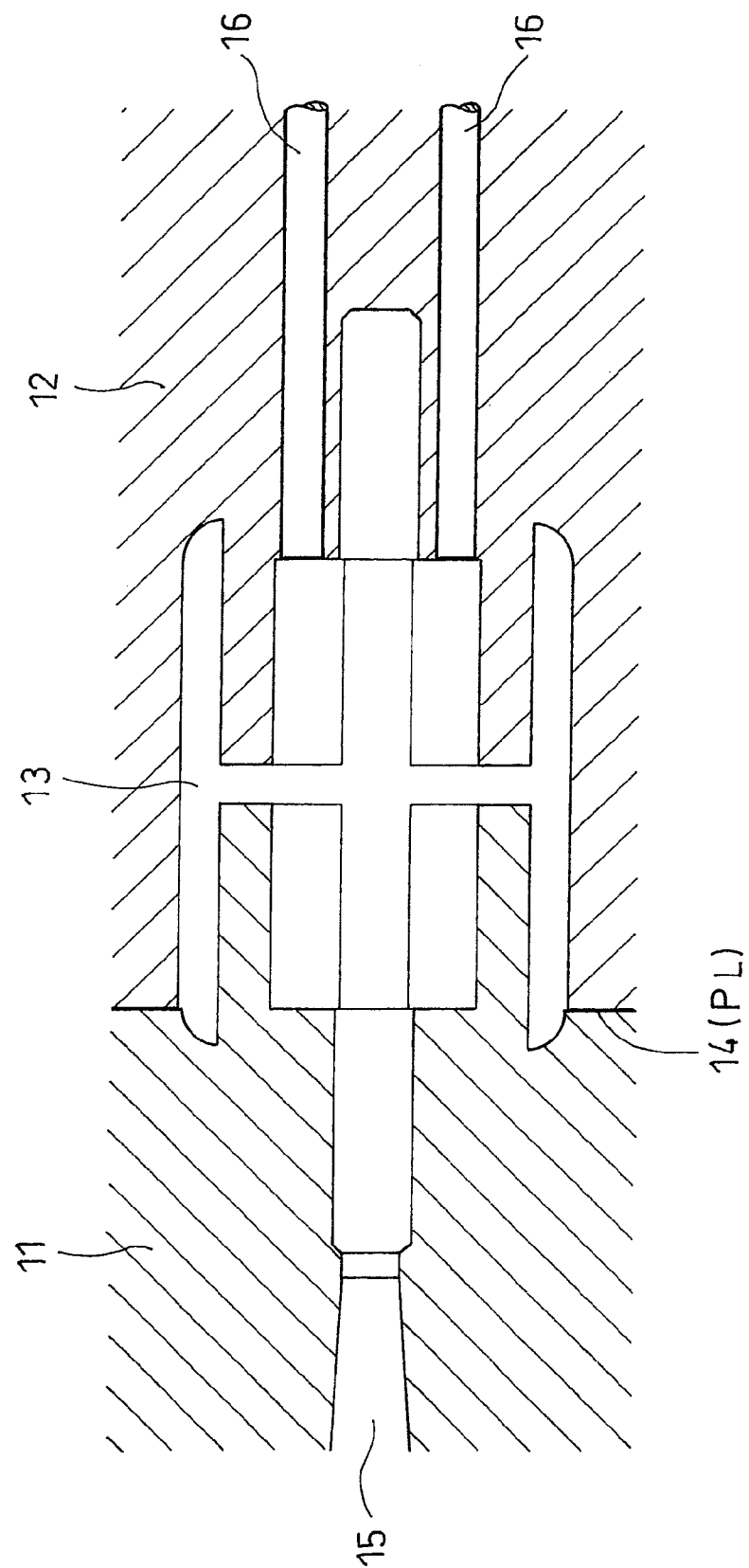

SHEET FEED ROLLING ELEMENT FOR USE IN AN ELECTROPHOTOGRAPHIC DEVICE AND MOLD FOR INJECTION MOLDING FOR PRODUCING THE SHEET FEED ROLLING ELEMENT

TECHNICAL FIELD

This invention relates to a sheet feed rolling element for feeding sheet on which images are formed in electrophotographic devices such as copiers, facsimiles and laser printers, and a mold for forming such a roller by injection molding.

BACKGROUND ART

In an electrophotographic device which utilizes an electrophotographic process, such as a copier or a laser printer, images formed on a photosensitive material by an electrophotographic process are transferred onto transfer sheets in the form of toner images. After fixing the transferred images on the sheets with an image fixing unit, the sheets are discharged from the device. The image fixing unit comprises an image fixing roller with a built-in heater, and a pressure roller pressed against the image fixing roller. Transfer sheets carrying toner images are passed through a nip portion between the rollers to melt and fix toner to the transfer sheets by heating and pressing. Then, the transfer sheets are discharged from the device by means of sheet feed rolling elements such as sheet discharge rollers. In some image fixing units, an image fixing member such as an image fixing belt is used instead of the image fixing roller.

FIG. 6 shows specific sheet feed rolling elements. FIG. 6 schematically shows an image fixing unit including an image fixing roller. The image fixing unit shown in FIG. 6 comprises the image fixing roller 22, which has a built-in heater 21, and a pressure roller 23 which is rotated by the image fixing roller with a transfer sheet sandwiched therebetween. A transfer sheet 25 fed from a transfer station, not shown, by a conveyor belt 24 and carrying unfixed toner images is guided by an image fixing unit entrance guide 26 and inserted into a nip portion between the image fixing roller 22 and the pressure roller 23. The rollers 22 and 23 sandwich the sheet, thereby feeding the sheet while fixing the toner images to the sheet. After the images are fixed, the leading end of the sheet 25 is peeled off from the image fixing roller 22 by the tip of a separation claw 27 located downstream of the nip portion of the image fixing roller 22. Once the sheet is peeled off from the image fixing roller 22, the sheet is fed through a feed path where the sheet passes between a sheet discharge roller 29, which is being driven, and a sheet discharge roller 28, which is pressed against and rotated by the roller 29, and is discharged from the device.

FIG. 7 shows a color laser printer in which after a transfer sheet carrying unfixed toner images passes between an image fixing roller 30 and a pressure roller 31, the sheet is peeled off from the image fixing roller 30 by a separation claw 32. The sheet then passes between the sheet discharge rollers 33 and 34, between a pair of intermediate guide rollers 35, and then between a driven roller 36 and an eject roller 37, and is discharged from the device. In FIG. 7, numeral 32a designates a separation claw in contact with the pressure roller 31. Numeral 38 in FIG. 7 indicates a laser unit; 39 is a toner storage; 40 is a photosensitive drum for forming electrostatic latent images; 41 is a transfer unit; 42 is a paper (sheet) storage cassette; and 43 is an image fixing unit.

Conventional sheet feed rolling elements used in the above-described image forming devices, such as sheet discharge rollers, intermediate guide rollers and eject rollers, are shown in FIGS. 8(a), 8(b) and 8(c), which are perspective views of the respective sheet feed rolling elements. The sheet feed rolling elements shown in FIGS. 8(a) and 8(b) are used as sheet discharge rollers or intermediate rollers, and each comprise a roller portion 51 and has support shafts 52 as rotary shafts at both ends of the roller portion 51, or a shaft hole 53. The sheet feed rolling element shown in FIG. 8(c) is used as an eject roller, and comprises a roller portion 51 and geared support shafts 54 at both ends of the roller portion 51. These sheet feed rolling elements are formed by injection molding a melt type fluororesin such as a tetrafluoroethylene-perfluoroalkyl vinyl ether copolymer (PFA), tetrafluoroethylene-ethylene copolymer (ETFE), tetrafluoroethylene-hexafluoropropylene copolymer (FEP), or tetrafluoroethylene-hexafluoropropylene copolymer (FEP) (see JP 9-315615A).

Molds for forming such rolling elements have a parting line that are provided at a position corresponding to one end of the roller portion 51 or spaced not more than 2 mm from one end of the roller portion 51 so that the parting line mark 51a, which is in the shape of a rib, does not look conspicuous and so that the sheet feed rolling element can be easily removed from the mold (see JP 2000-355434A). The position spaced not more than 2 mm from one end of the roller portion 51 is determined based on the size of the curved chamfer formed at each shoulder (edge) of the roller portion 51. For example, if the curved chamfer has a radius of 1 mm, the parting line (hereinafter abbreviated to "PL") is provided at the position spaced by 1 mm from the end of the roller portion.

But in this case, a circumferential parting line mark (hereinafter abbreviated to "PL mark") in the shape of a narrow strip is formed on the sheet sliding contact surface on the outer periphery of the sheet feed rolling element, and this mark is transferred to transfer sheets in the shape of a narrow strip. Thus, it is necessary to remove the PL mark by subjecting the sheet feed rolling element to post-treatment such as barreling or shot blasting. Such post-treatment is time-consuming and troublesome.

In order to avoid this problem, it is proposed to provide the PL at a position corresponding to the longitudinal central portion of the sheet sliding contact surface and to form the roller portion such that the sheet sliding contact surface has an outer diameter at its longitudinal central portion that is smaller than its outer diameter at both ends (see JP 2000-355434A).

There is also known a sheet feed rolling element for use in a color electrophotographic device which includes a film-like contact portion to be brought into contact with transfer sheets in order to reduce the contact pressure on transfer sheets, thereby improving the quality of images, and a mold for injection molding used to produce such a sheet feed rolling element (see JP 2004-189485A and Patent document 4: JP 2004-314310A).

With the sheet feed rolling element disclosed in JP 2000-355434A, a surface sink mark (recess) that forms during injection molding is used in order that the sheet sliding contact surface has an outer diameter at its longitudinal central portion that is smaller than its outer diameter at both ends. But it may be difficult to prevent the PL mark from protruding from the sheet sliding contact surface using the surface sink mark, because the sheet sliding contact surface of the sheet feed rolling element has a small outer diameter. With a sheet feed rolling element having a film-like sheet sliding contact surface too, it is difficult to prevent the PL mark from protruding from the sheet sliding contact surface using the surface sink mark, because the outer peripheral portion has a small wall thickness.

Under these circumstances, in an attempt to prevent the formation of a PL mark in the shape of a streak, the inventors of the present invention manufactured a sheet feed rolling element having a sheet sliding contact surface with a small outer diameter and shoulders on both sides which are formed by curved chamfers, with PL located where one of the curved chamfer is formed, and with the curved chamfers having an outer diameter slightly smaller than the outer diameter of the sheet sliding contact surface. But on the sheet sliding contact surface of the sheet feed rolling element actually formed by injection molding, a circumferential bulge formed near PL having a maximum radial dimension of 50 µm and a maximum axial dimension of 100 µm. Since this bulge causes streaks on transfer sheets, it is necessary to remove the bulge by subjecting the sheet feed rolling element to post-working such as barreling or shot blasting as in the conventional arrangement. Such post-working is troublesome.

Similar problems are observed in a sheet feed rolling element formed using the mold for injection molding as disclosed in Patent document 4, and having a film-like portion having the sheet sliding contact surface and a roller portion having shoulders on both sides which are formed by curved chamfers.

SUMMARY OF THE INVENTION

An object of the present invention is to provide sheet feed rolling element which is free of bulge even if the sheet sliding contact surface has a small outer diameter or is thin, thereby providing the electrophotographic device with high image quality without the need for post-working such as barreling.

In order to achieve this object, the present invention provides a sheet feed rolling element for use in an electrophotographic device, said rolling element being formed by injection molding and including a roller portion having an outer peripheral surface and shoulders on both sides of the outer peripheral surface, each of said shoulders being formed by a curved chamfer, wherein a step is formed on the curved chamfer of at least one of the shoulders, said step dividing the curved chamfer into a first portion near an end surface of the rolling element and a second portion near the outer peripheral surface, said first portion having a smaller diameter than said second portion.

Even when a sheet feed rolling element is formed having a sheet sliding contact surface with a small outer diameter and shoulders on both sides which are formed by curved chamfers, with PL located where one of the curved chamfer is formed, and with the curved chamfers having an outer diameter slightly smaller than the outer diameter of the sheet sliding contact surface so that the rolling element is free of a PL mark in the shape of a streak, a radially protruding circumferential bulge forms on the sheet sliding contact surface near PL. The inventors examined this phenomenon and discovered the following facts.

The bulge that forms on the sheet sliding contact surface near PL is not a molding burr produced between the abutment clearance of the mold for injection molding, but is produced due to a difference in shrinkage when molten resin flows. More specifically, since the sheet sliding contact surface of the sheet feed rolling element has to be smooth, the gate through which molten resin is injected into the cavity of the mold for injection molding is provided at one of the end surfaces of the sheet feed rolling element. When molten resin is injected into the cavity through this gate, resin flows along the outer peripheral surface in the axial direction and flows along the end surface in the diametrical direction.

When the molten resin cools down and solidifies, molding shrinkage occurs. If the resin is a crystalline resin, there appears a significant difference in shrinkage between the flow direction of resin (MD direction) and a direction perpendicular to this direction (CD direction). In this case, molding shrinkage in the MD direction is a dimensional difference in the MD direction, while molding shrinkage in the CD direction is a dimensional difference in the CD direction. In the case of the present invention, molding shrinkage in the MD direction refers to molding shrinkage in the radial direction where the molecular orientation of the resin is in the MD direction, and molding shrinkage in the CD direction refers to molding shrinkage in the radial direction where the molecular orientation of the resin is in the CD direction. In the case of a sheet feed rolling element, if the gate is provided at an end surface, resin flows along the outer peripheral surface in the MD direction and flows along the end surface in the CD direction.

With a sheet feed rolling element in which PL is located where a curved chamfer is formed and in which the curved chamfer has an outer diameter slightly smaller than the outer diameter of the sheet sliding contact surface, due to the slight difference between the outer diameter of the sheet sliding contact surface formed on the PL portion and the outer diameter of the curved chamfer, there is a portion in the PL portion where the molecular orientation is in the CD direction. It was discovered that the difference in molding shrinkage rate due to the difference in molecular orientation of the resin at the slight step in the PL portion affected the shape of the outer peripheral surface.

Thus, the present invention provides a mold for injection molding in which a portion of the cavity defined by one of the mold plates which forms the shoulder has an opening diameter smaller than the opening diameter of the portion of the cavity defined by the other plate, and a chamfer is formed on the outer peripheral surface of the roller portion of which the diameter decreases toward PL. With this arrangement, any increase in diameter of the outer peripheral surface due to a difference in orientation can be absorbed by the taper, thus preventing the formation of a circumferential bulge on the outer peripheral surface of the roller portion as the sheet sliding contact surface.

In the sheet feed rolling element according to this invention, any circumferential bulge that forms near the PL portion of the mold for injection molding never protrudes from the outer peripheral surface of the roller portion as the sheet sliding contact surface. Thus, it is possible to omit post-working such as barreling and shot blasting and thus to rationalize the manufacturing steps of the molded product.

By using this sheet feed rolling element in an electrophotographic device, when feeding sheets on which images are transferred, no streaks will form on the sheets due to a circumferential bulge on the roller portion.

BRIEF DESCRIPTION OF THE DRAWINGS

FIG. 3 is a sectional view of a mold for injection molding used in manufacturing the rolling element of FIG. 1.

DETAILED DESCRIPTION OF THE INVENTION

Figure 1:
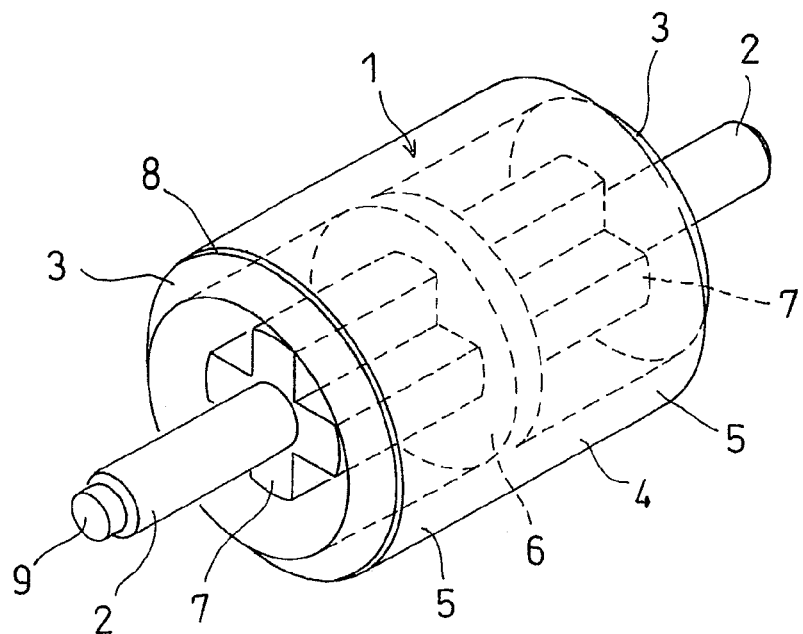
FIG. 1 is a perspective view of a sheet feed rolling element according to the present invention.

The embodiment of this invention is now described with reference to the drawings, which is directed to the manufacture of the sheet feed rolling element shown in FIGS. 1 and 2.

This sheet feed rolling element comprises a substantially columnar roller portion 1, and support shafts 2 provided at both ends of the roller portion 1 so as to extend axially from the radially central portion of the roller portion 1. Curved chamfers are formed on shoulders 3 of the roller portion 1, respectively. The roller portion 1 has an outer peripheral surface 4 as a sheet sliding contact surface which is cylindrical, i.e. has a uniform diameter over the entire axial length thereof. The roller has an inner space which is open at both ends. The outer peripheral surface 4 of the roller portion 1 is formed by a thin film portion 5 extending from both axial ends to the axial central portion. A disk portion 6 is formed at the axial central portion of the roller portion 1. Cross-shaped core portions 7 protrude axially from the central portions of the respective end surfaces of the disk portion 6. The support shafts 2 are formed such that their proximal ends are located on the distal end surfaces of the respective core portions 7.

A step 8 is formed at the boundary between the shoulder 3 at one end of the roller portion 1 and the outer peripheral surface 4 due to the difference in diameter between the openings of a cavity on the sides of a fixed mold plate and a movable mold plate of the below-described mold for injection molding. One of the support shafts 2 has at its distal end a gate mark 9 due to a gate through which molten resin is injected into the cavity.

The mold for injection molding used for manufacturing a sheet feed rolling element as described above includes, as shown in FIG. 3, a fixed mold plate 11 and a movable mold plate 12 which are in abutment with each other, defining a cavity 13 therein. The PL 14 of the fixed mold plate 11 and the movable mold plate 12 is located at the above-mentioned boundary between the shoulder 3 at one end of the roller portion 1 and the outer peripheral surface 4 of the roller portion 1.

The fixed mold plate 11, which forms one of the shoulders 3, has a gate 15 through which molten resin is injected into the cavity 13. The gate 15 opens to the cavity 13 at a position corresponding to the distal end of one of the support shafts 2. The movable mold plate 12, which forms the outer peripheral surface 4, has four eject pins 16 for pushing the formed sheet feed rolling element out of the cavity 13.

Figure 4A:
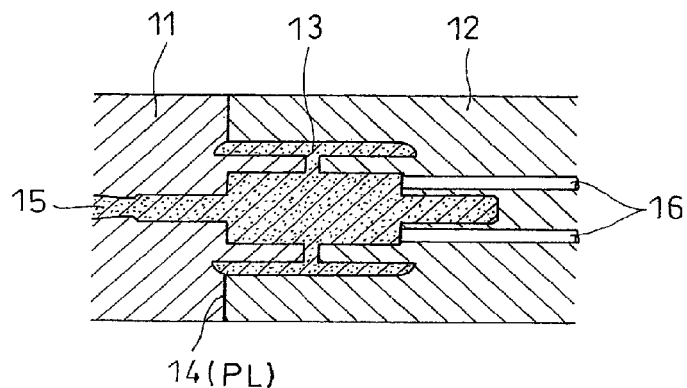
FIG. 4(a) is a sectional view of the mold of FIG. 3 showing the step of injecting molten resin.
Figure 4B:
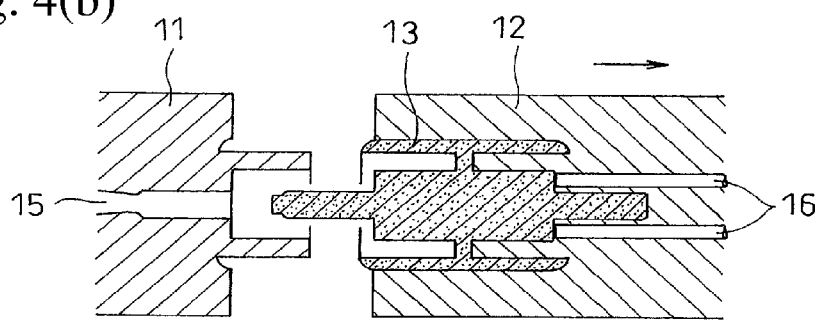
FIG. 4(b) is a sectional view showing the step of separating the movable mold plate from the fixed mold plate.
Figure 4C:
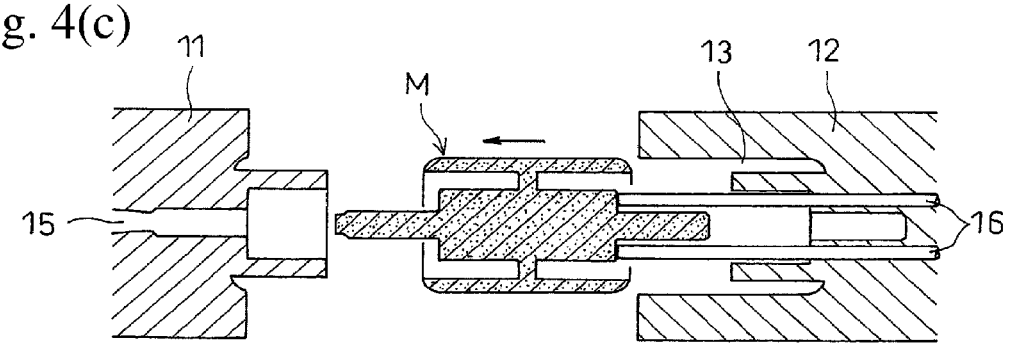
FIG. 4(c) is a sectional view showing the step of ejecting the molded product.

In forming a sheet feed rolling element using this mold, as shown in FIG. 4(a), with the fixed mold plate 11 and the movable mold plate 12 kept in abutment with each other, thereby closing the cavity 13, molten resin is injected into the cavity 13 until the cavity is filled with the molten resin. The molten resin is then cooled under pressure, and thereafter, the movable mold plate 12 is moved away from the fixed plate 11 to open the cavity 13, as shown in FIG. 4(b). In this state, the eject pins 16 are advanced to push the sheet feed rolling element M thus formed out of the cavity 13, as shown in FIG. 4(c).

Figure 5:
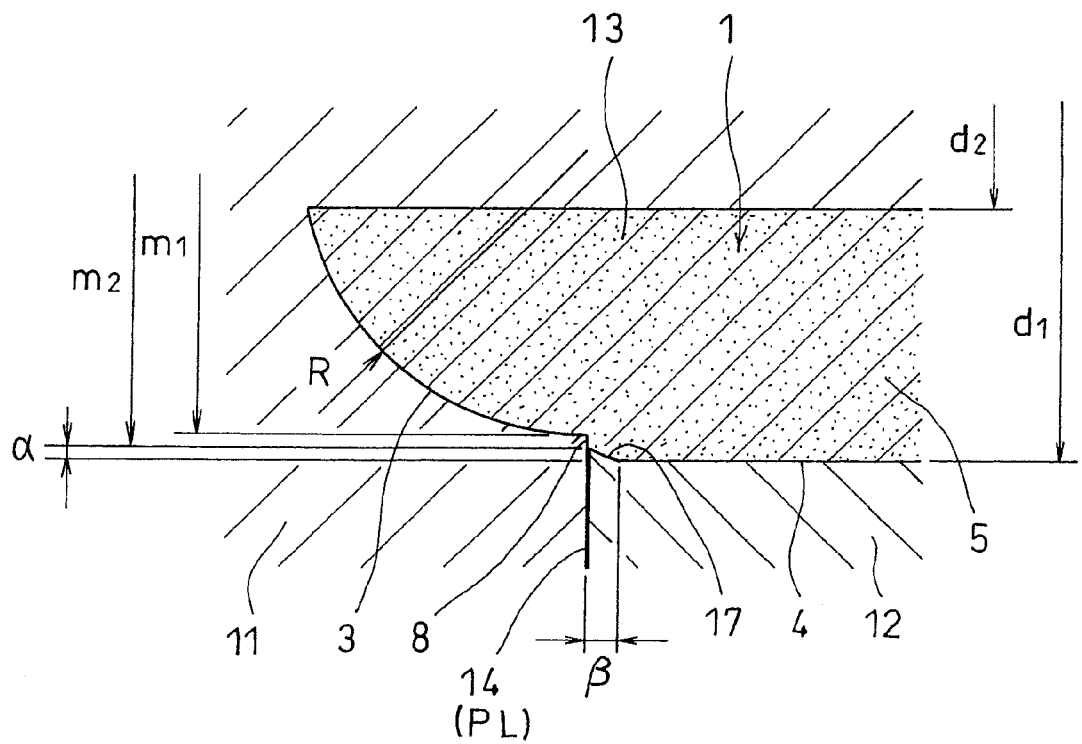
FIG. 5 is an enlarged sectional view of the mold of FIG. 4 showing its portion around the parting line.
Figure 6:
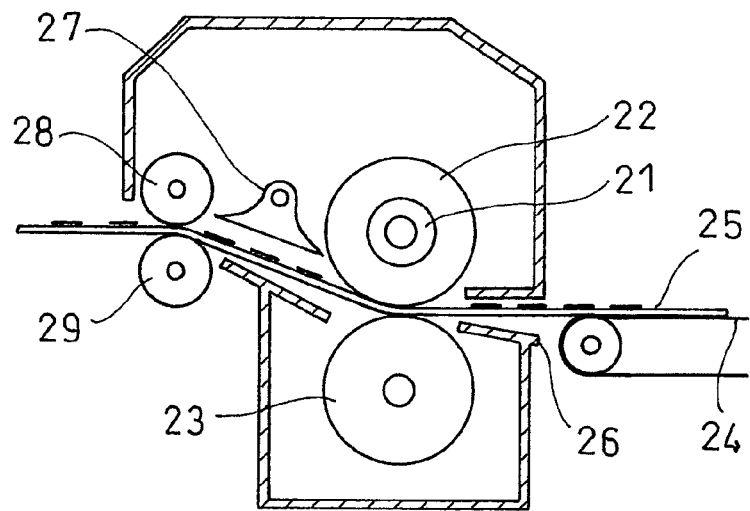
FIG. 6 schematically shows the structure of an image fixing unit.
Figure 7:
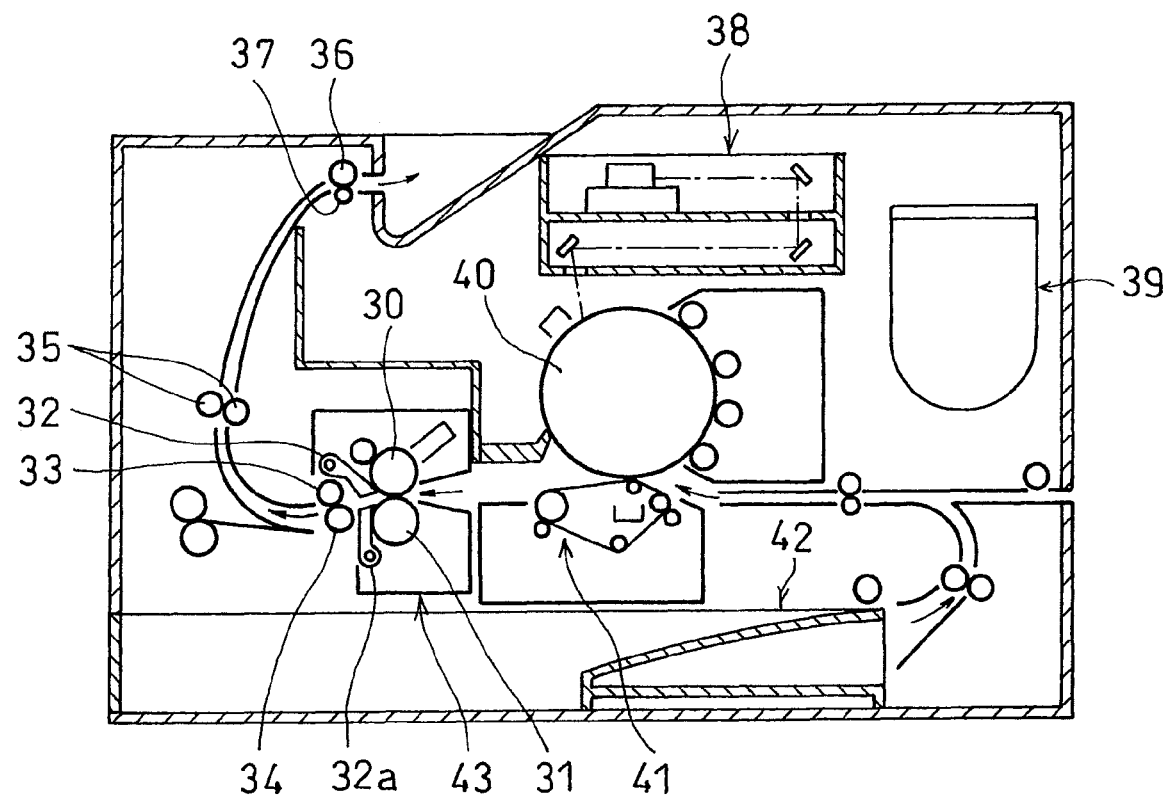
FIG. 7 schematically shows the structure of a color laser printer.
Figure 8A:
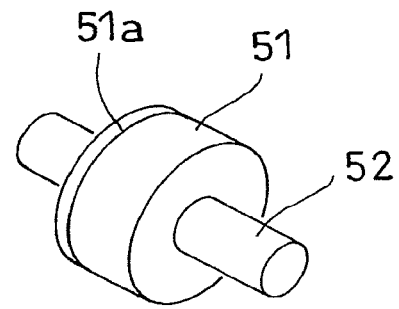
FIG. 8(a) is a perspective view of a roller having support shafts.
Figure 8B:
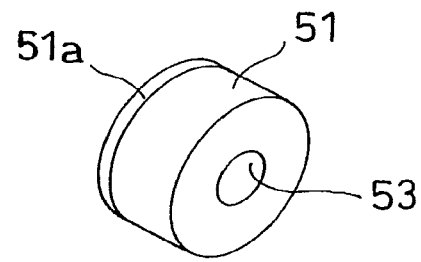
FIG. 8(b) is a perspective view of a roller formed with a shaft hole.
Figure 8C:
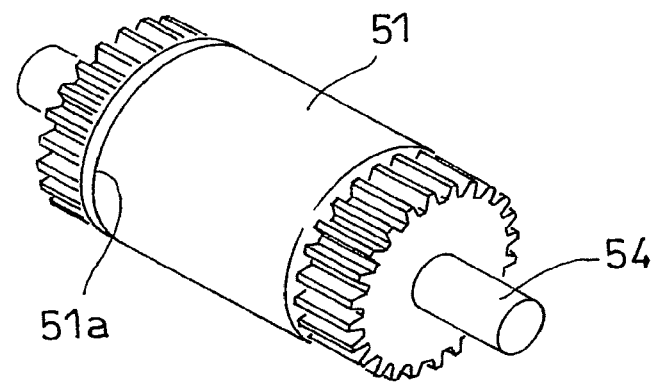
FIG. 8(c) is a perspective view of a roller with gears.

As shown in FIG. 5, the portion of the cavity 13 formed in the fixed mold plate 11, which forms the shoulder 3 adjacent to the PL 14, has an opening with a diameter $m_1$ which is smaller than the diameter $m_2$ of the opening of the portion of the cavity formed in the movable mold plate 12, which forms the outer peripheral surface 4. Along the opening of the portion of the cavity 13 formed in the movable mold plate 12, the movable mold plate 12 has a chamfer 17 which makes the diameter $m_2$ smaller than the diameter $d_1$ of its portion corresponding to the outer peripheral surface of the roller portion.

If, for example, the diameter $d_1$ corresponding to the outer peripheral surface of the roller portion is 10.0 mm, the diameter $d_2$ corresponding to the inner peripheral surface of the roller portion is 8.0 mm, and the radius R of the shoulder 3 is 1 mm, the difference in radius between the diameter $m_1$ of the opening of the portion of the cavity 13 formed in the fixed mold plate 11 and the diameter $m_2$ of the opening of the portion of the cavity 13 formed in the movable mold plate 12 is set to be 0.1 mm; the depth a of the chamfer 17, which is the difference in radius between the diameter $d_1$ of the portion of the movable mold plate 12 corresponding to the outer peripheral surface of the roller portion and the opening diameter $m_2$ of the cavity 13, is set to be 0.05 mm; and the axial width $\beta$ is set to be 0.1 mm.

With the sheet feed rolling element formed using this mold for injection molding, since the PL 14 is located at the small-diameter end of the chamfer 17, even if the outer peripheral surface 4 tends to radially expand near the PL 14 due to a difference in molding shrinkage rate resulting from a difference in orientation, the chamfer 17 prevents such radial expansion. Also, the chamfer 17 improves flowability of resin compared to when there is no such taper, thereby preventing development of circumferential bulge on the outer peripheral surface 4 of the roller portion 1, thereby preventing the formation of stripes on sheets being fed due to the bulge. A slight tapered portion of which the diameter gradually decreases toward the step 8 may remain on the outer peripheral surface 4 of the roller portion 1 near the step 8 when the rolling element has been formed.

Figure 2:
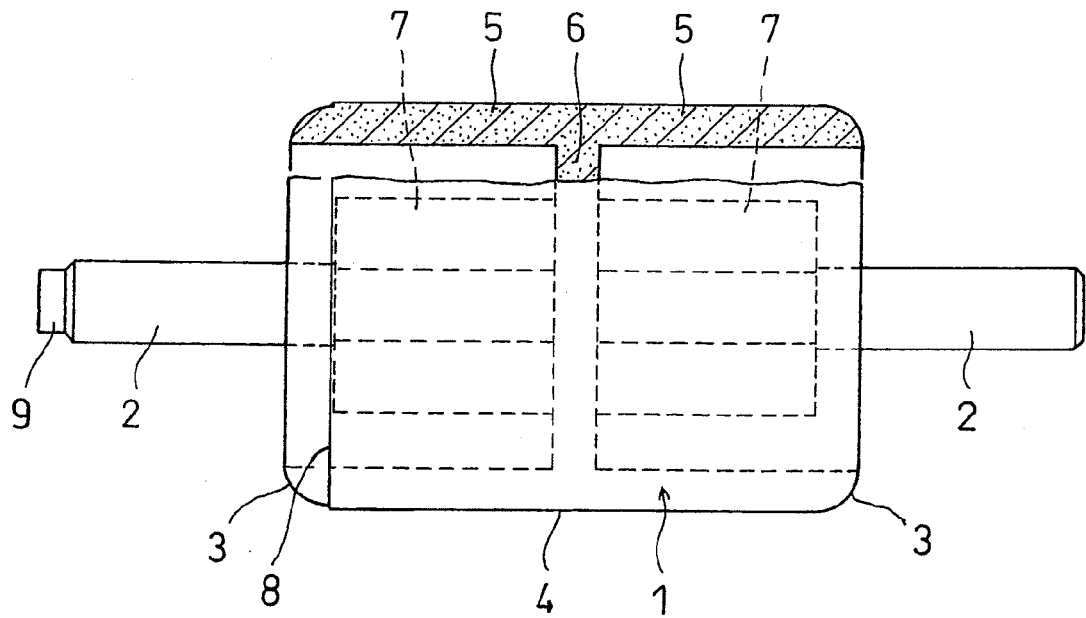
FIG. 2 is a partially cutaway front view thereof.

As illustrated in FIGS. 1 and 2, step 8 of the sheet feed rolling element extends fully about a circumference of the roller portion 1 and is spaced from the boundary between the outer peripheral surface 4 of the roller portion and the curved surface portion toward the end surface by a distance of from 0.05 mm to one-third of the radius of the curved chamfer. In FIG. 5, the curved surface portion refers to the shoulder 3 including the chamfer 17. By providing the step 8 in this area, it is possible to prevent bulging near the PL, and also, forced extraction of the chamfer 17 becomes easy.

The difference in radius between the diameter $m_1$ of the opening of the portion of the cavity 13 formed in the fixed mold plate 11 and the diameter $m_2$ of the opening of the portion of the cavity 13 formed in the movable mold plate 12 (see FIG. 5) is suitably determined according to the diameter $d_1$ corresponding to the outer peripheral surface of the roller portion, the thickness of the roller portion 1, and the kind of the resin, and is preferably in the range of 0.04 to 0.25 mm because in this range, even if a mismatch occurs between the fixed mold plate 11 and the movable mold plate 12, the shoulder 3 never protrudes from the outer peripheral surface 4 of the roller portion 1. If this value is smaller than the lower limit of this range, if a mismatch occurs between the fixed mold plate 11 and the movable mold plate 12, the shoulder 3 may protrude from the outer peripheral surface 4 of the roller portion 1. If this value is larger than the upper limit of the above range, there is a problem of imbalance in design between the shoulders 3 on both sides.

The depth α of the chamfer 17, which is the difference in radius between the diameter $d_1$ of the portion of the movable mold plate 12 corresponding to the outer peripheral surface of the roller portion and the opening diameter $m_2$ of the cavity 13, and its axial width β are also suitably determined according to the diameter $d_1$ corresponding to the outer peripheral surface of the roller portion, the thickness of the roller portion 1, and the kind of the resin. But preferably, the depth α of the chamfer 17 is 0.02 to 0.1 mm, and its width β is 0.05 to 0.3 mm, because if these values are in the above respective ranges, it is possible to absorb the difference between the molding shrinkage rates in the MD direction and the CD direction. If these values are lower than the lower limits of the respective ranges, it is difficult to absorb the difference in molding shrinkage rate, and a bulge may develop on the outer peripheral surface 4 of the roller portion 1. If these values are higher than the upper limits of the respective ranges, forced extraction from the movable mold plate 12 becomes excessive, which increases the possibility of e.g. deformation of the outer peripheral surface 4 of the roller portion 1.

Preferably, the curved chamfer of each shoulder 3 has a radius of 0.6 to 3.0 mm, and the film portion 5 has a thickness of 0.7 to 2.0 mm.

The sheet feed rolling element according to this invention is preferably made of a tetrafluoroethylene-perfluoroalkyl vinyl ether copolymer (PFA), a tetrafluoroethylene-ethylene copolymer (ETFE), or a tetrafluoroethylene-hexafluoropropylene copolymer (FEP), which are all injection-moldable fluororesins. In order to increase mechanical strength, fibrous fillers may be added to the fluororesin. Instead of such fluororesin, a synthetic resin such as polyacetal resin, polyphenylene sulfide resin or polyamide resin may be used too. But if a synthetic resin other than fluororesin is used, it is necessary to sufficiently increase non-adhesiveness to toner by e.g. forming a fluororesin film on the surface or by mixing fluororesin powder.

EXAMPLE 1

Using the mold for injection molding shown in FIGS. 3 to 5, a sheet discharge roller as shown in FIGS. 1 and 2 was formed by the injection molding of ETFE. The sheet discharge roller thus formed had a diameter of 10.0 mm, an inner diameter of 8.0 mm and an axial length of 12.0 mm at its roller portion 1, and the curved chamfer of each shoulder 3 had a radius R of 1 mm. The outer peripheral surface 4 was a cylindrical surface parallel to the axis. The difference in radius between the opening diameters $m_2$ and $m_1$ of the cavity 13 at PL 14 was 0.1 mm; the depth α of the chamfer was 0.05 mm; and the width β of the chamfer was 0.1 mm. When the portion of the sheet discharge roller formed where there is PL 14 was observed under a toolmakers microscope, no bulge was found on the outer peripheral surface 4.

Figure 9:
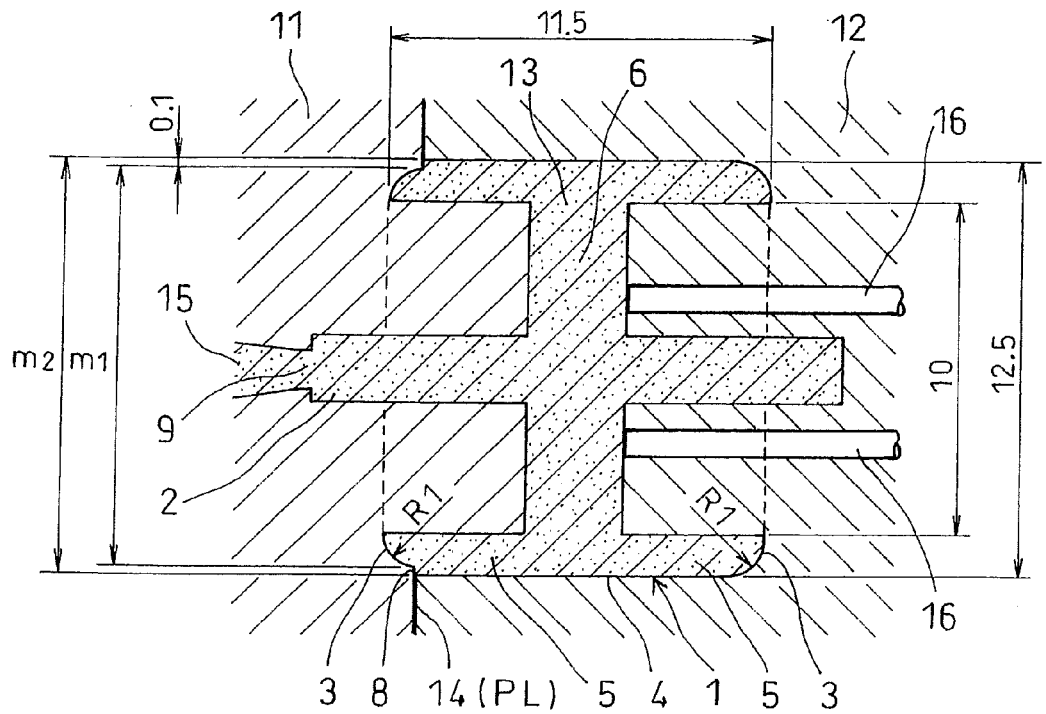
FIG. 9 is a sectional view of a mold for injection molding of a comparative example, showing how molten resin is injected into the mold.

As a comparative example, using a mold for injection molding shown in FIG. 9, which has a diameter of 12.5 mm, an inner diameter of 10.0 mm and an axial length of 11.5 mm at the roller portion 1, in which the curved chamfer of each shoulder 3 has a radius R of 1 mm, in which the difference in radius between the opening diameters $m_2$ and $m_1$ of the cavity 13 at PL 14 is 0.1 mm and in which there is no step on the curved surface forming each shoulder 3, a sheet discharge roller was formed by the injection molding of the same material as used for the sheet discharge roller of the example of the invention. When the portion of the sheet discharge roller thus formed where there is PL 14 was observed under a toolmakers microscope, a protruding bulge of about 50 μm was found on the outer peripheral surface 4 near PL 14.

Figure 10:
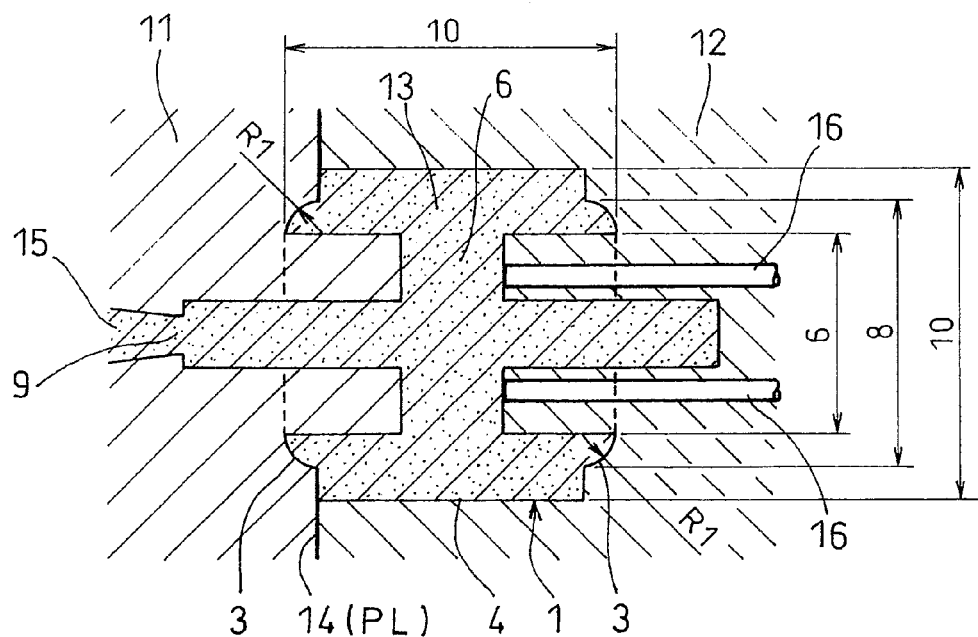
FIG. 10 is a sectional view of a mold for injection molding of a reference example, showing how molten resin is injected into the mold.

As a reference example, using a mold for injection molding shown in FIG. 10, which has a diameter of 10 mm, an inner diameter of 6 mm and an axial length of 10 mm at the roller portion 1, in which the curved chamfer of each shoulder 3 has a radius R of 1 mm, in which a large-diameter portion of each shoulder 3 has a diameter of 8 mm, and in which there is no step on the curved surface forming each shoulder 3, a roller was formed by injection molding. A protruding bulge of about 55 μm was found on the outer peripheral surface 4 near each shoulder 3. This clearly indicates that protruding bulges are formed not due to PL but due to a difference in molding shrinkage rate resulting from a difference in orientation of resin.

The sheet discharge roller of the example of the invention was mounted to an image fixing unit of a commercially available laser printer and the printer was normally operated normally for two weeks. No scars in the shape of streaks were found on sheets discharged from the laser printer during this period.

What is claimed is:

1. A sheet feed rolling element for use in an electrophotographic device, said rolling element being formed by injection molding and including a roller portion having an outer peripheral surface and shoulders on both sides of the outer peripheral surface, each of said shoulders being formed by a curved chamfer;

wherein a step is formed fully about a circumference of the rolling element on the curved chamfer of at least one of the shoulders, said step dividing the curved chamfer into a first portion near an end surface of the rolling element and a second portion near the outer peripheral surface, a diameter of said first portion being smaller than a diameter of said second portion;

wherein the diameter of said first portion of the curved chamfer gradually decreases from said step to the end surface of the rolling element such that the first portion of the curved chamfer has a first extreme end disposed at said step and a second extreme end disposed at the end surface of the rolling element;

wherein the diameter of said second portion of the curved chamfer gradually decreases from the outer peripheral surface of the roller portion to said step such that the second portion of the curved chamfer has a first extreme end disposed at an end of the outer peripheral surface of the roller portion and a second extreme end disposed at said step; and wherein the outer peripheral surface is constituted by a smooth surface, the outer peripheral surface and the shoulders are mutually integral portions of the roller portion, and the outer peripheral surface and the shoulders are both formed of the same material.

2. The sheet feed rolling element of claim 1 wherein the curved chamfer of each of the shoulders has a radius of 0.6 to 3.0 mm.

3. The sheet feed rolling element of claim 1 wherein the step is spaced from a boundary between the outer peripheral surface of the roller portion and the curved chamfer toward the end surface by a distance of from 0.05 mm to one-third of the radius of the curved chamfer.

4. The sheet feed rolling element of claim 1 wherein the curved chamfer of said at least one shoulder has a tapered portion which extends from the outer periphery to the step such that a diameter thereof decreases from the outer periphery toward the step.

5. The sheet feed rolling element of claim 1 wherein the outer peripheral surface of the roller portion is a cylindrical surface.

6. The sheet feed roller of claim 5 wherein the roller portion has a film portion forming the outer peripheral surface and having a thickness of 0.7 to 2.0 mm.

7. The sheet feed roller of claim 1 wherein the roller portion has an axially extending support shaft or a shaft hole at a radially central portion thereof.

8. The sheet feed roller of claim 7 wherein a gate for injecting molten resin into a cavity of a mold for injection molding is positioned at a free end of the support shaft.

9. The sheet feed roller of claim 1 which is made of a fluororesin.

\* \* \* \* \*